US010698675B2

(12) United States Patent
Bathen et al.

(10) Patent No.: US 10,698,675 B2
(45) Date of Patent: Jun. 30, 2020

(54) DECENTRALIZED AUTOMATED SOFTWARE UPDATES VIA BLOCKCHAIN

(71) Applicant: International Business Machines Corporation, Armonk, NY (US)

(72) Inventors: Luis Angel D. Bathen, Placentia, CA (US); Gabor Madl, San Jose, CA (US); Mu Qiao, Belmont, CA (US); Ramani R. Routray, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 15/383,793

(22) Filed: Dec. 19, 2016

(65) Prior Publication Data
US 2018/0176229 A1    Jun. 21, 2018

(51) Int. Cl.
*G06F 8/65* (2018.01)
*H04L 9/32* (2006.01)
*H04W 12/10* (2009.01)

(52) U.S. Cl.
CPC .............. *G06F 8/65* (2013.01); *H04L 9/3239* (2013.01); *H04L 9/3247* (2013.01); *H04W 12/10* (2013.01); *H04L 2209/38* (2013.01)

(58) Field of Classification Search
CPC ......... G06F 8/65; H04L 63/12; H04L 9/3239; H04L 9/3247; H04L 2209/38; H04W 12/10
USPC .......................................................... 717/171
See application file for complete search history.

(56) References Cited

U.S. PATENT DOCUMENTS

| | | | | |
|---|---|---|---|---|
| 5,410,703 | A * | 4/1995 | Nilsson | G06F 11/1433 717/168 |
| 8,739,153 | B2 | 5/2014 | Keys et al. | |
| 2006/0107025 | A1* | 5/2006 | Cypher | G06F 12/0864 711/216 |
| 2007/0061800 | A1* | 3/2007 | Cheng | G06F 8/65 717/170 |
| 2009/0319502 | A1* | 12/2009 | Chalouhi | H04L 67/104 |
| 2014/0040873 | A1* | 2/2014 | Goldman | G06F 8/65 717/168 |
| 2015/0379510 | A1* | 12/2015 | Smith | G06Q 20/3829 705/71 |

(Continued)

FOREIGN PATENT DOCUMENTS

| | | | | |
|---|---|---|---|---|
| CN | 107425982 A * | 12/2017 | | H04L 9/3247 |
| RU | 2673842 C1 * | 11/2018 | | H04L 9/3234 |

OTHER PUBLICATIONS

Herbert et al.,"A Novel Method for Decentralised Peer-to-Peer Software License Validation Using Cryptocurrency Blockchain Technology", Jan. 2015, Australasian Computer Science Conference (ACSC) (Year: 2015).*

(Continued)

*Primary Examiner* — Wei Y Zhen
*Assistant Examiner* — Junchun Wu

(57) ABSTRACT

A blockchain of transactions may be referenced for various purposes and may be later accessed by interested parties for ledger verification. One example operation may comprise one or more of identifying an updated software build, creating a hash based on the updated software build, storing the hash of the updated software build in a blockchain, and storing a binary representation of the updated software build in a distributed hash table (DHT).

20 Claims, 8 Drawing Sheets

100

(56) References Cited

U.S. PATENT DOCUMENTS

| | | | |
|---|---|---|---|
| 2016/0191243 A1 | 6/2016 | Manning | |
| 2016/0203313 A1* | 7/2016 | El-Moussa | G06F 8/65 726/23 |
| 2016/0253622 A1* | 9/2016 | Sriram | G06Q 10/0833 713/179 |
| 2016/0261690 A1* | 9/2016 | Ford | H04L 67/1044 |
| 2017/0243208 A1* | 8/2017 | Kurian | G06Q 20/40 |
| 2017/0344987 A1* | 11/2017 | Davis | H04L 63/06 |
| 2017/0344988 A1* | 11/2017 | Cusden | H04L 9/3247 |
| 2018/0096360 A1* | 4/2018 | Christidis | H04L 9/3239 |
| 2019/0147431 A1* | 5/2019 | Galebach | G06Q 20/02 705/44 |
| 2019/0358515 A1* | 11/2019 | Tran | A63B 21/0724 |

OTHER PUBLICATIONS

Fotiou et al., "Decentralized Name-based Security for Content Distribution using Blockchains", 2016, IEEE (Year: 2016).*

Zyskind et al., "Decentralizing Privacy: Using Blockchain to Protect Personal Data", 2015, IEEE (Year: 2015).*

Xu et al., "The Blockchain as a Software Connector", 2016, IEEE (Year: 2016).*

Wall et al., "Using Blockchain Technology and Smart Contracts to Create a Distributed Securities Depository", Jun. 2016, Lund University (Year: 2016).*

Karlsson, Jonathan et al., "Robust Security Updates for Connected Devices," Thesis, Department of Electrical and Information Technology, Lund University, Mar. 14, 2016, 103 pages.

Nilsson, Dennis K. et al., "Key Management and Secure Software Updates in Wireless Process Control Environments," Proceedings of the First ACM Conference on Wireless Network Security, pp. 100-108, ACM, 2008.

Pureswaran, Veena et al., "Device democracy: Saving the future of the Internet of Things," IBM Institute for Business Value, Executive Report, 2014, 28 pages.

Benet, Juan, "Ipfs—Content Addressed, Versioned, P2P File System," arXiv preprint arXiv:1407.3561, 2014, 11 pages.

* cited by examiner

300

350

DECENTRALIZED AUTOMATED SOFTWARE UPDATES VIA BLOCKCHAIN

TECHNICAL FIELD

This application relates to software updates, and more particularly, to decentralized automated software updates via a blockchain.

BACKGROUND

Managing software updates for large-scale infrastructures presents challenges for IT administrators. In order to keep track of the latest updates to various machines on a network, a large amount of device and version information must be maintained and updated periodically to reflect any changes which occur.

Conventional methods for software updates may be based on specific companies and their preferred approaches to distributing the updates. For example, distribution models which are known include "water fall", "spiral", "agile", etc. Automated patch updates may assist with the burden of wide-scale updating, however, the automation is not enough to ensure security as hackers and unauthorized parties could simulate the approach taken by the organization and distribute harmful software to many different devices on the network.

SUMMARY

One example embodiment may include a method that comprises one or more of identifying an updated software build, creating a hash based on the updated software build, storing the hash of the updated software build in a blockchain, and storing a binary representation of the updated software build in a distributed hash table (DHT).

Another example embodiment may include a processor configured to perform one or more of identify an updated software build, create a hash based on the updated software build, store the hash of the updated software build in a blockchain, and store a binary representation of the updated software build in a distributed hash table (DHT).

Still another example embodiment may include a non-transitory computer readable storage medium configured to store instructions that when executed cause a processor to perform one or more of identifying an updated software build, creating a hash based on the updated software build, storing the hash of the updated software build in a blockchain, and storing a binary representation of the updated software build in a distributed hash table (DHT).

DETAILED DESCRIPTION

Figure 1A:
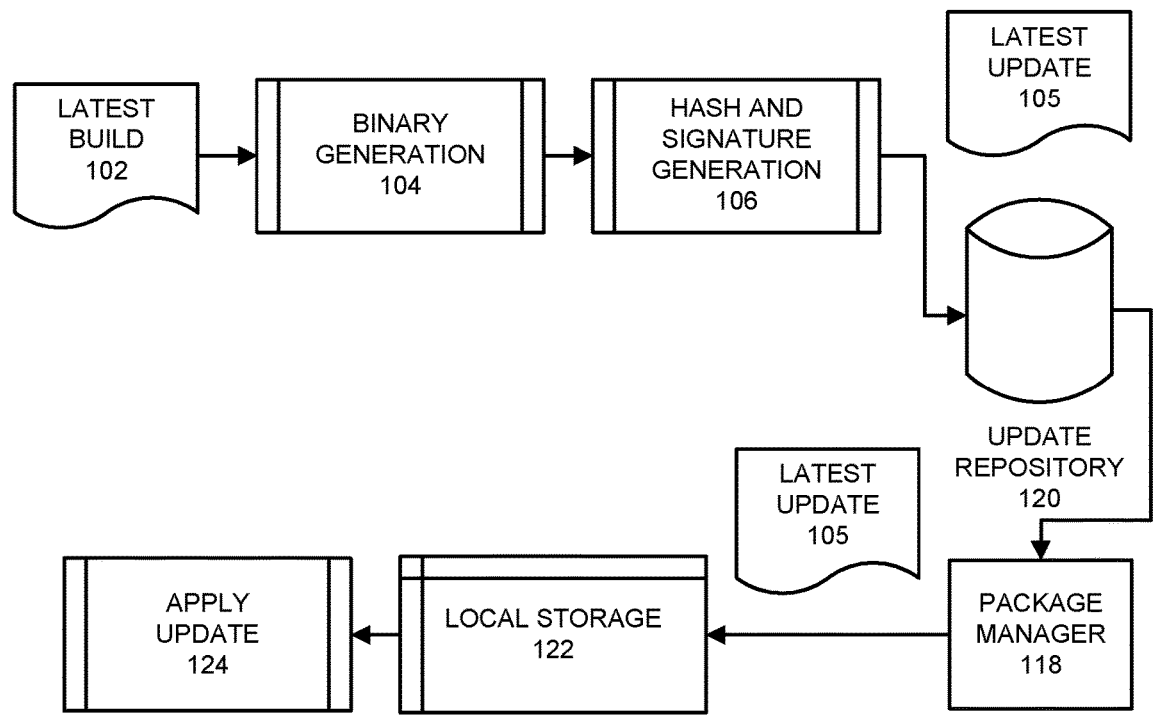
FIG. 1A illustrates a conventional software update procedure according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide using a blockchain to provide automated software updates, referencing blockchain data to update software versions/patches of participating devices, and an automated software patching system that utilizes blockchain technology to distribute secure software updates/patches. For example, a software-build-and-test and/or proof-of-work is used to provide data immutability, while not wasting compute cycles. The blockchain can store the hashes of each software build, while the binary data can be stored in an available DHT or the entire software-history can be hosted in a 'zeuS' blockchain for increased trust guarantee. Additional details of the zeuS blockchain configuration are provided in the co-pending U.S. patent application Ser. No. 15/350,793, entitled "DECENTRALIZED IMMUTABLE STORAGE BLOCKCHAIN CONFIGURATION", filed on Nov. 14, 2016, the entire contents of which is hereby incorporated by reference One example may use a blockchain to build secure binaries, deliver them, and mitigate any man-in-the-middle attacks. This configuration ensures that software can receive the latest updates despite distributed denial-of-service (DDoS) attacks on the infrastructure, or other node failures. The blockchain can be used to update software patches.

Placing a software build (i.e., beta version 'x.y') into the blockchain, the build of software is stored in hashes, however, the binary data is placed in the DHT for better accessibility. The DHT is a distributed hash where parts of a hash are placed in different nodes on a network. The DHT is not like a centralized blockchain but is commonly used with a blockchain to store different data associated with the blockchain and stored by nodes which are on the P2P network but which are in fact storing their own part of the DHT. The DHT is a distributed hash table, which distributes parts of its data across different nodes on a network through erasure coding and replication.

Updating software applications, operating systems, firmware, etc., is needed as software complexity continues to increase. In turn, the number of potential vulnerabilities or possible failures due to falsified software also increase. Especially, with Internet of Things (IoT) products, security is increasingly important. 'Patching' is one of the best ways to keep systems up to date, in order to not just have the latest features, but to reduce the attack surface for possible attackers. Most major corporations release a build for a necessary infrastructure to keep up with critical updates, but as their infrastructures continue to increase, such mechanisms start to need additional changes. Moreover, updating systems across the Internet, outside of a controlled environment, is a burdensome process. Users may not opt to update their systems, or systems may not have constant connectivity to the web. IoT is expected to include billions and eventually trillions of devices. The IoT world can base its approach from the PC world, where millions of devices have enabled robust patching mechanisms, such as Windows-based systems, or Linux-based systems. Users can set automatic updates to patch their systems and keep up with the latest updates. However, hackers can still leverage the same update mechanism deployed by Microsoft or Linux or any enterprise to infect the very same systems users want to protect by patching.

A trustless patch delivery system may leverage blockchain to enable secure and reliable software updates. Essentially, any corporation performing software builds would have nodes that would perform daily builds, which are tested and verified. Nodes that verify builds can add the build to the blockchain as the latest verifiable portion of software. The more blocks which include validation for the blocks, the more difficult it will be for an attacker to overwrite the software. The update itself to the latest codebase will then enact a poll of the blockchain. Nodes can verify the validity of the firmware level as the nodes can poll different nodes in the blockchain. A proof-of-work based on regression testing and build of software packages will replace the traditional proof-of-work as systems would need to perform a valid build and regression test that adheres to the organization's standards before being able to add any malicious code to a particular build. This will make attacks difficult to implement.

The blockchain builds binaries and stores the hash of the software build. In one example, the blockchain is used to inform end devices that a new software build is available and provides them with the hash of software builds along with other metadata. The actual binary is stored within a DHT or zeuS. This would permit the scaling and distribution of different binaries. The zeuS permits the storage of any data into a blockchain, while making it scalable and achieves this by keeping virtual chains, while the actual data is distributed across different nodes using erasure coding instead of full replication. The software distribution includes using a DHT or zeuS.

FIG. 1A illustrates a conventional software update procedure according to example embodiments. Referring to FIG. 1, a traditional update process is illustrated, where a software product is built, signed, and distributed to a main repository. Referring to FIG. 1A, the configuration 100 includes each client connecting to a repository on a specific scheduled time (e.g., daily, weekly, on-demand, etc.). Once an update is detected, the client will then download the latest updates, apply them, and keep going. In the enterprise, a last step would be for the client to send a notification to an agent somewhere that it has completed the update. Alternatively, clients are scanned for compliance, and their software levels are checked. In the event a client is not in compliance, the owner will be emailed with the request to do the update in order to be complaint. This architecture may include a latest build 102 being converted to a binary 104, hashed and signed 106 and submitted to an update repository 120 accessible by various subscribers. The latest update 105 can then be provided to the package manager 118 which organizes the package for delivery to a local storage 122 accessible by the client so the update can be applied 124. This approach is not ideal for corporations that may release software on a periodic basis with millions of clients, so often, a more hierarchical approach is taken as illustrated in FIG. 1B.

Figure 1B:
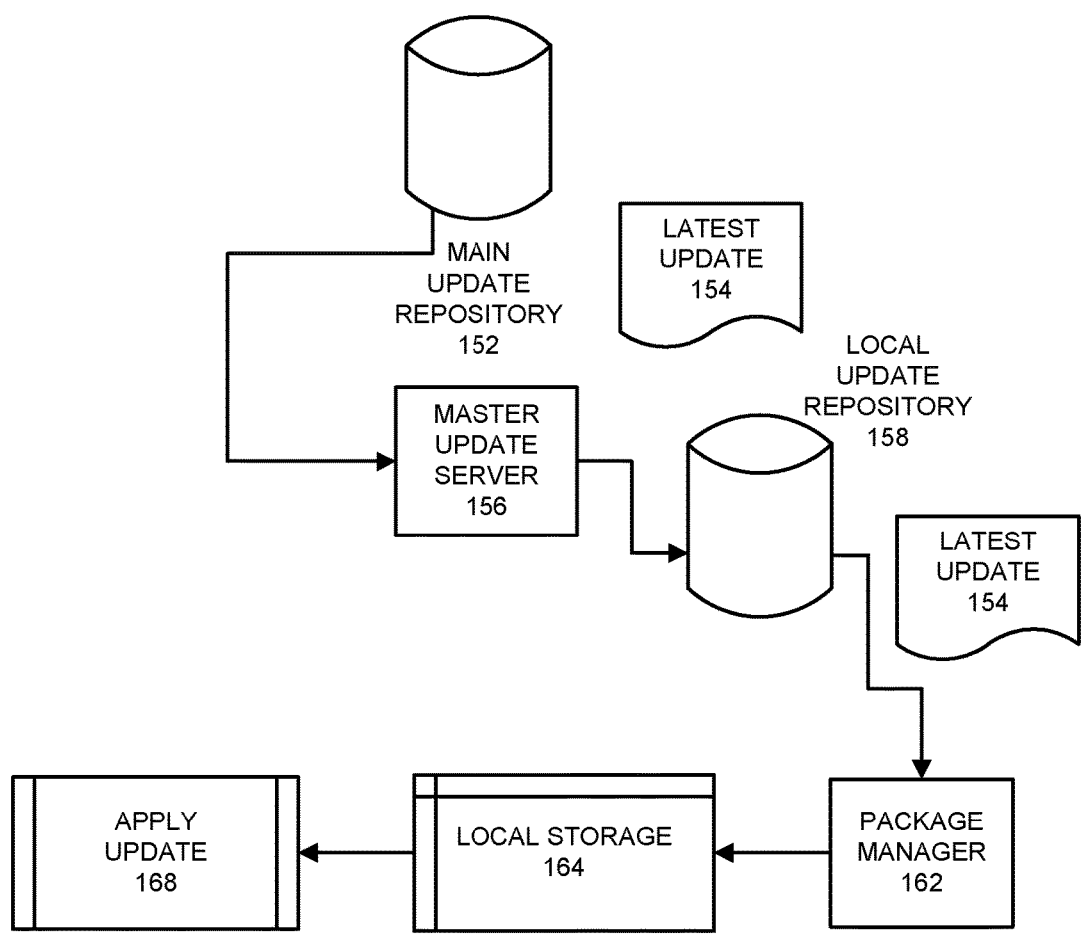
FIG. 1B illustrates a conventional software update procedure with a hierarchical structure according to example embodiments.

FIG. 1B illustrates a conventional software update procedure with a hierarchical structure according to example embodiments. Referring to FIG. 1B, a simple hierarchical scheme 150 may include main repository 152 where a latest update 154 can be provided and managed by a server 156 to a local repository 158. The update can then be easily transferred to package manager 162 for local storage 164 and local updates application 168. An organization may install one of n-servers, where the servers download the patch/update from the central repository, and then serve the different clients in the enterprise.

Figure 1C:
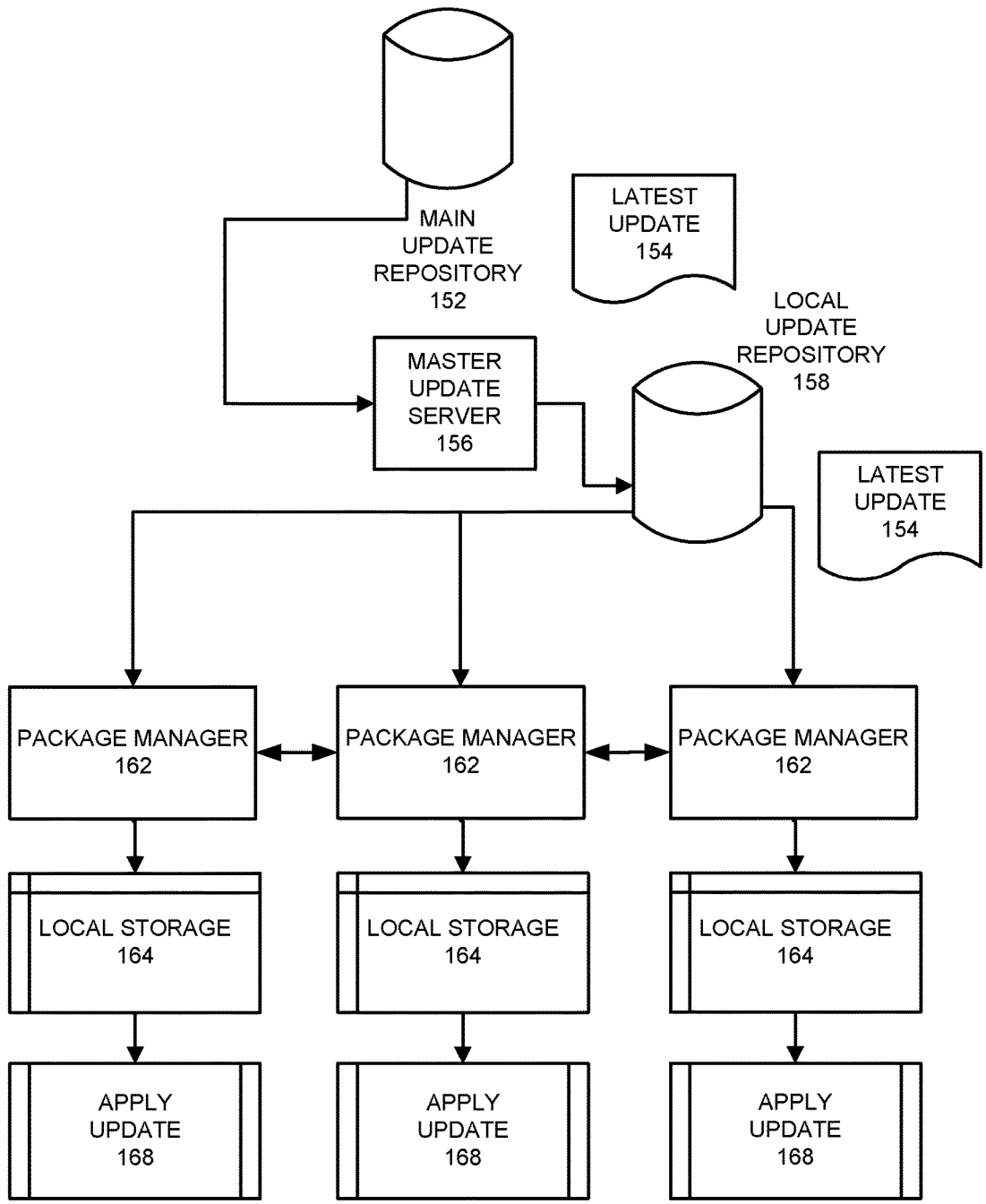
FIG. 1C illustrates a conventional software update procedure including peer-to-peer updates according to example embodiments.

FIG. 1C illustrates another conventional approach that attempts to leverage clients on the same network to download patches/updates from each other. This type of patch distribution 170 removes the load from the local repositories at the enterprise level and relies on a P2P model for distribution. Referring to FIG. 1C, a secure trusted distribution channel may be used to distribute data from the main update repository 152 via a master update server 156 and local update repository 158, however, the update 154 is shared between various different package managers 162, local stores 164 and update processes 168 so the distribution is decentralized and does not require as much server bandwidth or centralized data management. One assumption is that the master or local update repositories are trustworthy and free of malicious attacks. However, recent attacks carried out by leveraging update mechanisms (e.g., Windows OS updates) and attacks against official repositories (e.g., Linux Mint's), indicate that there is a need for a more robust and secure way to distribute software patches.

In the instant application, devices will query the blockchain service for the latest software build for their blockchain address. Blockchain addresses are used to target devices or families of devices. Each builder will obtain the latest codebase via a repository (such as git pull, svn checkout, etc.). The builder will build the software and perform regression testing. Upon passing the tests, the code hash is signed and the respective metadata is entered into the blockchain. The metadata entered comprises one or more of the target device/device family address, branch name, repository URL, tag, version hash number, as well as the hash of the binary generated. Binaries are treated as assets with respect to the blockchain, and these assets are sent to the addresses of the devices belonging to the binary. Prior to adding the binary metadata to the blockchain, the latest version is identified and proposed for a particular target address. If another builder has already built the software and sent the binary to the address, then the binary is signed, and a signature is sent to that address attesting that the software has been built, and that the same binary hash is present. Otherwise, the metadata is signed by the builder node and added to the blockchain.

Example embodiments provide an automated software patching system that leverages blockchain technology to distribute secure software updates/patches. A software-build-and-test proof-of-work is used in order to provide data immutability, while not wasting compute cycles. The blockchain can store the hashes of each software build, while the binary data can be stored in a highly available DHT, or the entire software-history can be hosted in a zeuS blockchain for higher trust guarantees.

Figure 2A:
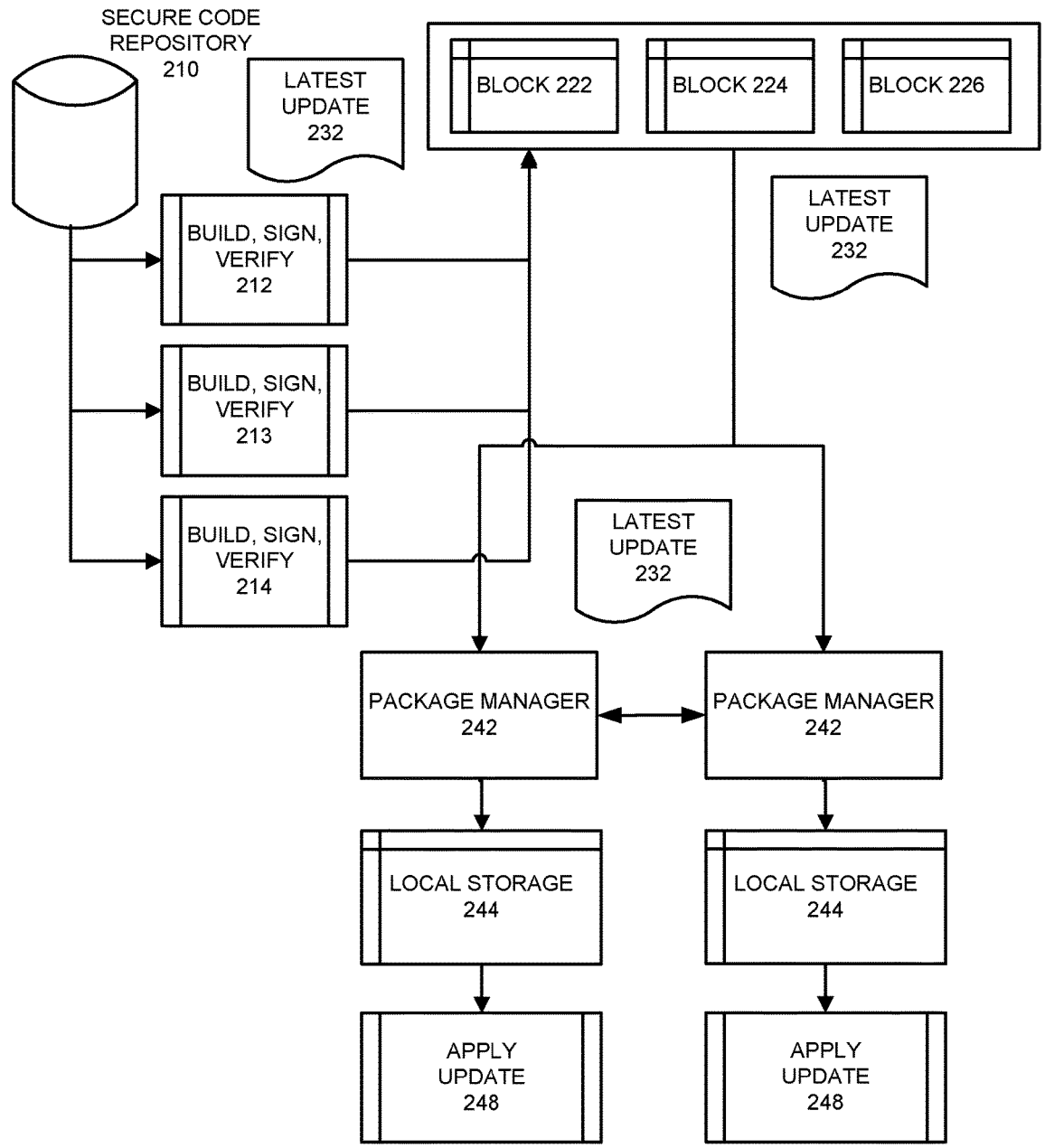
FIG. 2A illustrates a blockchain-based software update procedure diagram according to example embodiments.

FIG. 2A illustrates a blockchain-based software update procedure 200 according to example embodiments. Blockchain-based decentralized firmware/software updates may be performed. The process starts with an assumption that the code repository is secure and that other processes are to be trustless. Each build node in the system will download the latest source code snapshot from the repository 210 and build it, perform regression testing, and sign it, for example, 212, 213, 214. The signed binaries, the signatures, along with other metadata is then built into custom blockchain transactions 222, 224 and 226 and sent to the network miners (verifiers), with multiple signatures per component built. Each verifier node will fetch transactions from its memory pool ('mempool'), fetching the code version from the trusted repository (e.g., git pull), and build it whole or build k-random pieces/libraries in the build and use the signatures to verify the validity of the binaries provided by the build nodes.

Verifiers broadcast transactions to their peers and when a node finishes verifying a transaction, it will add it to a current block. Once each node has verified 'p' number of transactions, it will generate a block, append it to the blockchain or its 'fork', and broadcast the block to all other verifiers in the network. When a verifier receives a new block, it will perform per-transaction validation as in the previous operation. Once a block is deemed valid, it will append it to its blockchain and broadcast it to all of its known peers. Blockchain verifiers can be on-premise or off-premise with the assumption that they may have read-only access to the base source code. Each client will opt to participate in the network, whenever a new block is placed in the blockchain, it will scan to determine whether any updates 232 to its software stack are present. If so, it will download it from the blockchain, either a full node or a peer, verify its signature, and apply it accordingly. Each client has a full record of its software stack either in memory or in the blockchain, since each client has a blockchain address, all software updates belonging to that particular address are recorded and searchable in the blockchain. Hence, when an update is identified for its address, the client will verify that the update belongs to the same update chain it had in memory, which prevents attackers from adding a seemingly 'valid' change without breaking the trust chain. The package manager 242, the local storage 244 and the update application 248 may operate in a manner similar to the examples in FIG. 1C, however, the blockchain blocks are used to store the valid data.

Verifiers perform the same building process as the builders. The difference is that they use the metadata stored in the blockchain sent by the builders in order to verify that the build/binary belongs to a particular software build in order to detect tampering. This approach supports policy-based software distribution which can define simple smart contracts that dictate how a software package is verified. For example, a simple smart contract would provide: software build A is valid if N out of M verifying nodes have signed the binary (e.g., the asset/binary stored at address A has n-out-of-m signatures). The verifiers are expected to be trusted nodes (e.g., they are designated to check the validity of the software). Each manufacturer could define how they wish to verify that the builds are valid (e.g., one may say validate only a random set of components within a build, another manufacturer may say validate the whole build, at which point, a validator would behave like a builder node). Verifiers act like miners. Essentially, when the verification process has ended, the transaction that signs the software build is added to its block, and also sent to peers. The instant approach uses software builds as a proof-of-work. However, other approaches may be used to perform generating/mining blocks. The procedures will follow the same mining process as traditional blockchains. Each node keeps track of its latest block. Block height is used to define what is the longest chain. If a verifier/miner sees that there is a new block, it will discard its current block, add the current block transactions to the mempool, and start building a new block. In this software distribution model, it is assumed that end devices have the ability to manage key pairs. These keys are pre-loaded by the manufacturer, and the public key is used to derive an address, which is then use to track what software version a particular device of family of devices should be currently operating.

A software build is acceptable based on a distribution policy. Each manufacturer may have different policies. The policies are sent to the blockchain as smart contracts. For instance, the smart contract assigned to a device/family address 'A' may provide that if n-out-of-m builders have attested to the validity of the software, then it may be deemed valid. Upon that contract evaluating to 'true', devices know to update their software stack. Similarly, the policy may dictate that you need n-out-of-m builders and k-out-of-p verifiers. The value of 'n' and 'k' may be less than or equal to the value of 'm' and 'p', respectively. If a verifier or build detects a mismatch, then the builder/verifier sends a revocation token to the address. The rest of the builders will check this token, if anyone else detects an issue, then this particular software build may be deemed as invalid. This permits the invalidation of binaries upon detection of vulnerabilities or bugs. This is a policy procedure, each manufacturer can choose to specify, and a smart contract will also dictate when a software binary becomes invalid (e.g., s-out-of-t signatures).

IoT devices of device families can all share the same public/private key pairs, and updates can be sent to a particular address based on a particular public key, so only devices with access to the private key corresponding to the address can download and install the patch. Software companies can opt to distribute targeted patches to specific clients, all using the same common infrastructure. This provides for trustless automatic updating as clients can verify that the piece of software they are installing is indeed a valid piece of software as it has been validated by the network. In this scenario, an attacker can no longer hijack a node in the network, introduce a malicious update, and rely on the same update mechanism to install the malicious software on the unsuspecting client. Also, each client will be able to identify the malicious package and realize that the trust chain does not match what it is receiving, and therefore drop the invalid software update. Additionally, the zeuS blockchain, which leverages DHTs to provide higher availability may provide lower storage overheads than traditional blockchains.

Figure 2B:
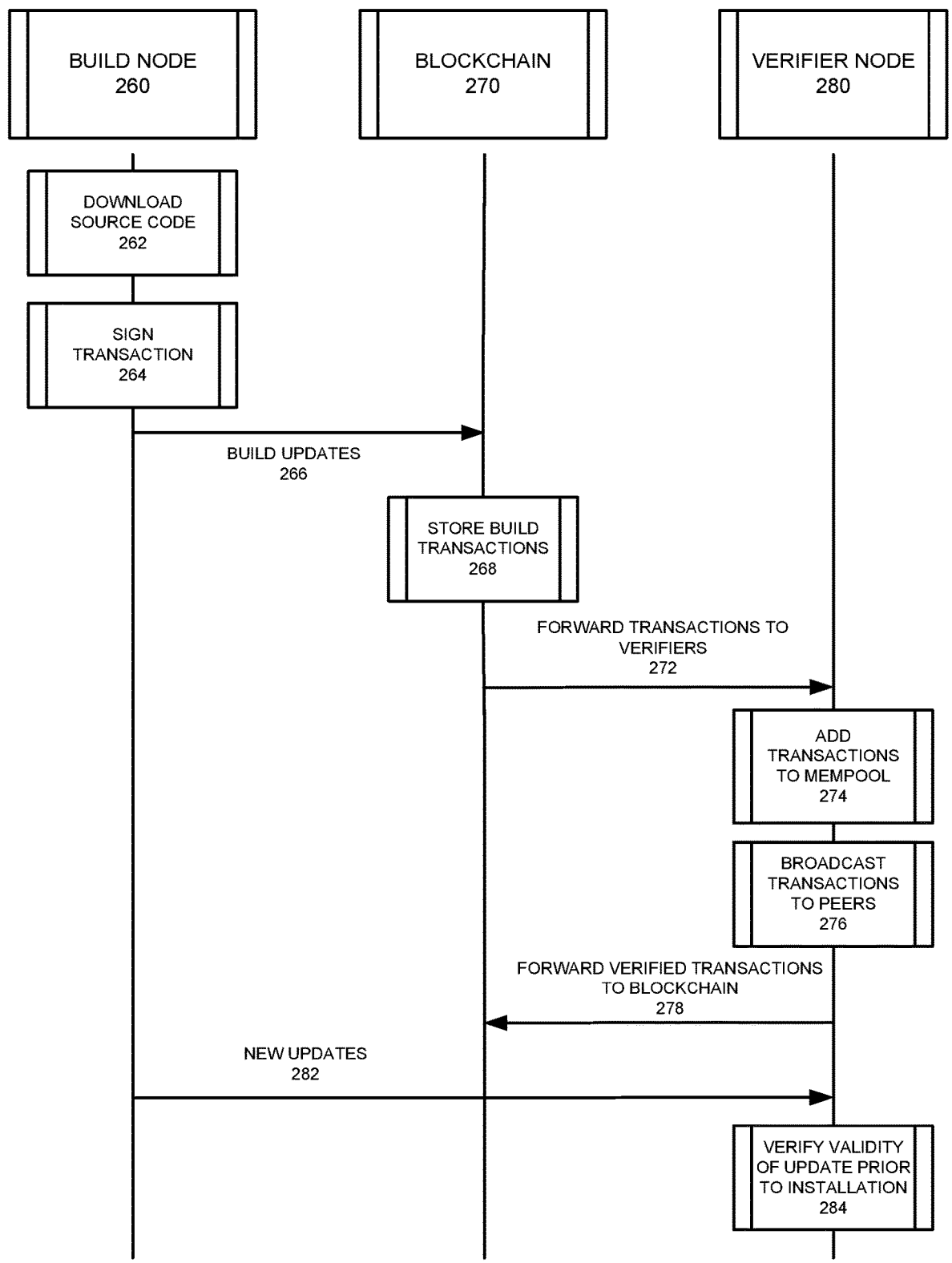
FIG. 2B illustrates a blockchain-based system procedure diagram according to example embodiments.

FIG. 2B illustrates a blockchain-based system procedure diagram according to example embodiments. Referring to FIG. 2B, the system configuration 250 illustrates a build node 260 downloading source code 262 and performing the necessary signing and verification 264 prior to storing the code in the blockchain 270. The build transactions 266 can be stored 268 and forwarded 272 to verifier nodes 280, which verify the transactions and add them to their memory pools 'mempools' 274 and broadcast them 276 if necessary. The forwarded verified transactions can be sent to the blockchain 278 for record purposes. Any new software updates are sent 282 to the verifiers nodes 280 and can be verified and broadcast as well 284 prior to installation.

Figure 3A:
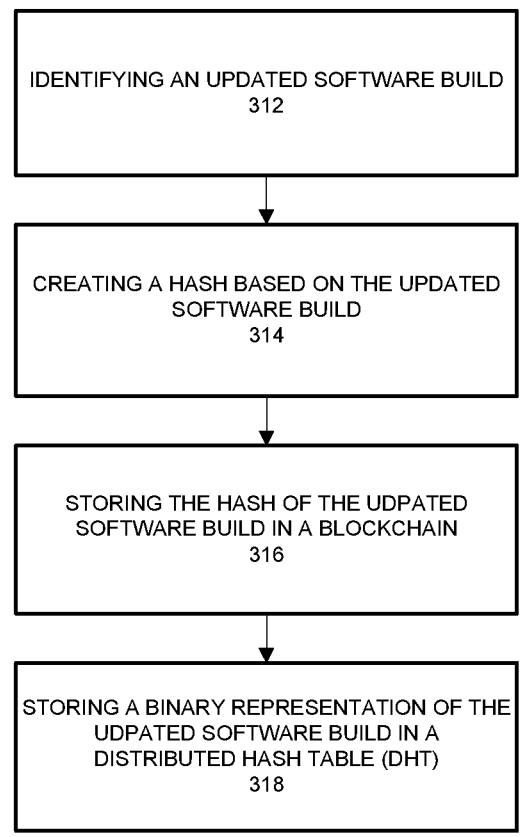
FIG. 3A illustrates a flow diagram of an example method of storing software updates on the blockchain according to example embodiments.

FIG. 3A illustrates a flow diagram of an example method 300 of storing software updates on the blockchain according to example embodiments. Referring to FIG. 3A, the method may include identifying an updated software build 312, creating a hash based on the updated software build 314, storing the hash of the updated software build in a blockchain 316, and storing a binary representation of the updated software build in a distributed hash table (DHT) 318. The DHT is distributed between a plurality of nodes operating on a peer-to-peer network. The method may also include receiving signed binaries, signatures and metadata from the plurality of nodes, creating a blockchain transaction related to one or more of the signed binaries, signatures and metadata, and transmitting the blockchain transaction to one or more verification nodes.

The method may also include receiving verified blocks from the one or more verification nodes, and broadcasting the verified blocks to the plurality of nodes. The method may also include scanning the verified blocks, and identifying whether the updated software build in the verified blocks is a new software build as compared to a current software build operating on one or more of the plurality of nodes, and responsive to identifying the updated software build is a new software build, downloading the software build from the blockchain, and verifying a signature associated with the new software build, and applying the new software build to the one or more of the plurality of nodes.

Figure 3B:
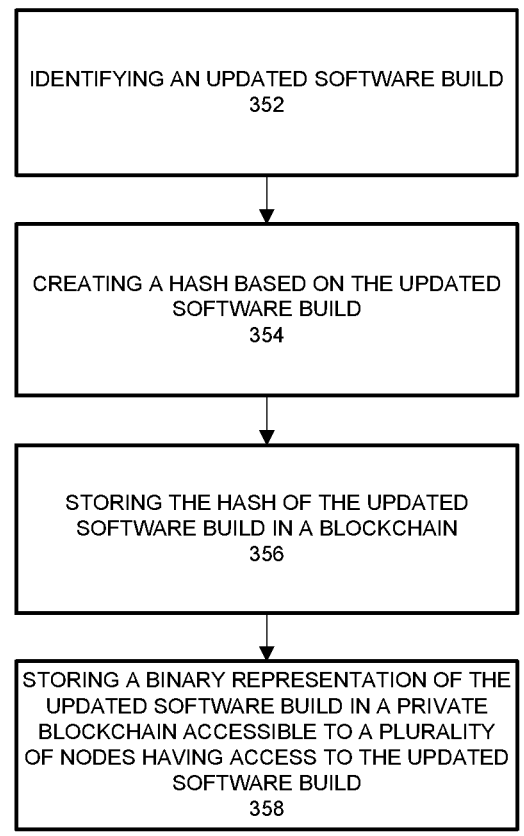
FIG. 3B illustrates a flow diagram of an example method of storing software updates on the blockchain according to example embodiments.

FIG. 3B illustrates a flow diagram of an example method 350 of storing software updates on the blockchain according to example embodiments. In this example, the method may include identifying an updated software build 352, creating a hash based on the updated software build 354, storing the hash of the updated software build in a blockchain 356, and storing a binary representation of the updated software build in a private blockchain accessible to a plurality of nodes having access to the updated software build 358. The private blockchain may be another way to have a smaller-sized blockchain or an exclusive blockchain with less transactions available for storing the binary data for quick and easy access. The private blockchain may also have rules which could quickly implode its existence if necessary.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 4 illustrates an example network element 400, which may represent or be integrated in any of the above-described components, etc.

Figure 4:
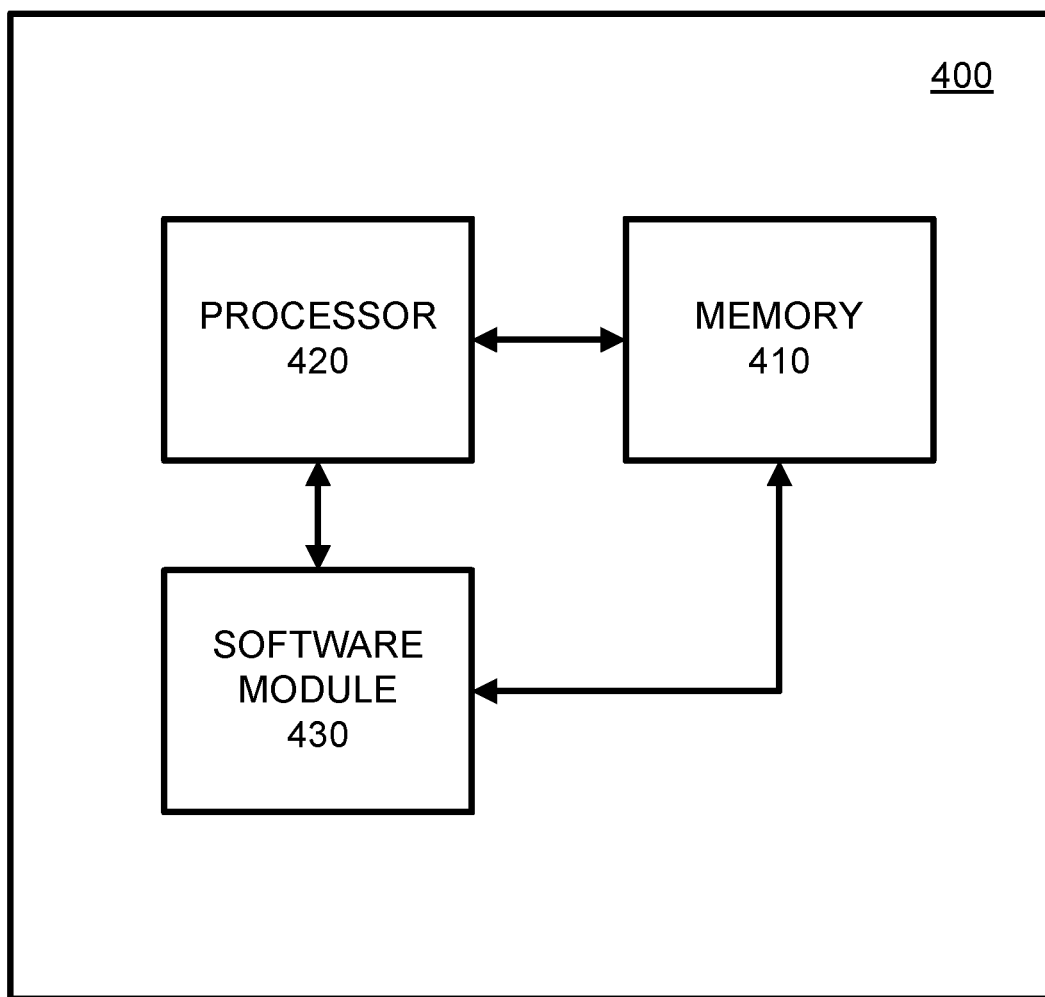
FIG. 4 illustrates an example network entity configured to support one or more of the example embodiments.

As illustrated in FIG. 4, a memory 410 and a processor 420 may be discrete components of a network entity 400 that are used to execute an application or set of operations as described herein. The application may be coded in software in a computer language understood by the processor 420, and stored in a computer readable medium, such as, a memory 410. The computer readable medium may be a non-transitory computer readable medium that includes tangible hardware components, such as memory, that can store software. Furthermore, a software module 430 may be another discrete entity that is part of the network entity 400, and which contains software instructions that may be executed by the processor 420 to effectuate one or more of the functions described herein. In addition to the above noted components of the network entity 400, the network entity 400 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
identifying an updated software build;
creating a hash based on the updated software build;
storing the hash of the updated software build in a blockchain;
storing a binary representation of the updated software build in a distributed hash table (DHT);
transmitting the DHT to a plurality of nodes;
responsive to transmitting the DHT to the plurality of nodes, receiving response data from the plurality of nodes;
creating a blockchain transaction comprising the response data; and
transmitting the blockchain transaction to one or more verification nodes for verification based on a smart contract specifying a particular number of verification nodes required for verification of the blockchain transaction.

2. The method of claim 1, wherein the plurality of nodes are operating on a peer-to-peer network.

3. The method of claim 1, wherein the response data comprises signed binaries, signatures and metadata.

4. The method of claim 1, further comprising:
receiving verified blocks from the one or more verification nodes; and
broadcasting the verified blocks to the plurality of nodes.

5. The method of claim 4, further comprising:
scanning the verified blocks; and
identifying whether the updated software build in the verified blocks is a new software build as compared to a current software build operating on one or more of the plurality of nodes.

6. The method of claim 5, further comprising:
responsive to identifying the updated software build is a new software build, downloading the new software build from the blockchain;
verifying a signature associated with the new software build; and
applying the new software build to the one or more of the plurality of nodes.

7. The method of claim 1, further comprising:
determining whether n-out-of-m builders have attested to a validity of the updated software build, and if so, deeming the updated software build valid, wherein 'n' is an integer value equal to or less than cm'.

8. An apparatus, comprising:
a processor configured to:
identify an updated software build;
create a hash based on the updated software build;
store the hash of the updated software build in a blockchain; and
store a binary representation of the updated software build in a distributed hash table (DHT);
a transmitter configured to transmit the DHT to a plurality of nodes;
a receiver configured to receive response data from the plurality of nodes, responsive to the DHT being transmitted to the plurality of nodes; and
wherein the processor is further configured to create a blockchain transaction comprising the response data, and the transmitter is further configured to transmit the blockchain transaction to one or more verification nodes for verification based on a smart contract specifying a particular number of verification nodes required for verification of the blockchain transaction.

9. The apparatus of claim 8, wherein the plurality of nodes are operating on a peer-to-peer network.

10. The apparatus of claim 8, wherein the response data comprises signed binaries, signatures and metadata.

11. The apparatus of claim 8, wherein the receiver is configured to receive verified blocks from the one or more verification nodes, and the transmitter is configured to broadcast the verified blocks to the plurality of nodes.

12. The apparatus of claim 11, wherein the processor is configured to scan the verified blocks, and identify whether the updated software build in the verified blocks is a new software build as compared to a current software build that operate on one or more of the plurality of nodes.

13. The apparatus of claim 12, further comprising:
responsive to the updated software build being identified as a new software build, the processor is further configured to:
download the new software build from the blockchain,
verify a signature associated with the new software build, and
apply the new software build to the one or more of the plurality of nodes.

14. The apparatus of claim 8, wherein the processor is further configured to:
determine whether n-out-of-m builders have attested to a validity of the updated software build, and if so, then the processor is further configured to:
deem the updated software build valid, wherein 'n' is an integer value equal to or less than cm'.

15. A non-transitory computer readable storage medium configured to store at least one instruction that when executed by a processor causes the processor to perform:
identifying an updated software build;
creating a hash based on the updated software build;
storing the hash of the updated software build in a blockchain;
storing a binary representation of the updated software build in a distributed hash table (DHT);
transmitting the DHT to a plurality of nodes;
responsive to transmitting the DHT to the plurality of nodes, receiving response data from the plurality of nodes;
creating a blockchain transaction comprising the response data; and
transmitting the blockchain transaction to one or more verification nodes for verification based on a smart contract specifying a particular number of verification nodes required for verification of the blockchain transaction.

16. The non-transitory computer readable storage medium of claim 15, wherein the plurality of nodes are operating on a peer-to-peer network.

17. The non-transitory computer readable storage medium of claim 16, wherein the response data comprises signed binaries, signatures and metadata.

18. The non-transitory computer readable storage medium of claim 15, further configured to store at least one instruction that when executed by the processor causes the processor to perform:
receiving verified blocks from the one or more verification nodes; and
broadcasting the verified blocks to the plurality of nodes.

19. The non-transitory computer readable storage medium of claim 18, further configured to store at least one instruction that when executed by the processor causes the processor to perform:
scanning the verified blocks;
identifying whether the updated software build in the verified blocks is a new software build as compared to a current software build operating on one or more of the plurality of nodes;
responsive to identifying the updated software build is a new software build, downloading the new software build from the blockchain;
verifying a signature associated with the new software build; and
applying the new software build to the one or more of the plurality of nodes.

20. The non-transitory computer readable storage medium of claim 15, further configured to store at least one instruction that when executed by the processor causes the processor to perform:
determining whether n-out-of-m builders have attested to a validity of the updated software build, and if so, deeming the updated software build valid, wherein 'n' is an integer value equal to or less than 'm'.

* * * * *